(12) United States Patent
Courbat (10) Patent No.: US 11,547,151 B2
(45) Date of Patent: Jan. 10, 2023

(54) ELECTRICALLY OPERATED AEROSOL-GENERATING DEVICE WITH CONTINUOUS POWER REGULATION

(71) Applicant: Philip Morris Products S.A., Neuchatel (CH)

(72) Inventor: Jerome Christian Courbat, Cortaillod (CH)

(73) Assignee: Philip Morris Products S.A., Neuchatel (CH)

( * ) Notice: Subject to any disclaimer, the term of this patent is extended or adjusted under 35 U.S.C. 154(b) by 330 days.

(21) Appl. No.: 16/645,927

(22) PCT Filed: Oct. 4, 2018

(86) PCT No.: PCT/EP2018/077032
§ 371 (c)(1),
(2) Date: Mar. 10, 2020

(87) PCT Pub. No.: WO2019/068821
PCT Pub. Date: Apr. 11, 2019

(65) Prior Publication Data
US 2020/0275707 A1    Sep. 3, 2020

(30) Foreign Application Priority Data
Oct. 5, 2017   (EP) .................................. 17195037

(51) Int. Cl.
*A24F 40/57* (2020.01)
*A24F 40/53* (2020.01)
(Continued)

(52) U.S. Cl.
CPC .............. *A24F 40/53* (2020.01); *A24F 40/46* (2020.01); *A24F 40/57* (2020.01); *A24F 40/20* (2020.01);
(Continued)

(58) Field of Classification Search
CPC ....................................................... A24F 40/57
See application file for complete search history.

(56) References Cited

U.S. PATENT DOCUMENTS

2011/0265806 A1    11/2011   Alarcon et al.
2014/0270727 A1*    9/2014   Ampolini ................ A24F 40/50
                                                          392/394
(Continued)

FOREIGN PATENT DOCUMENTS

EP    2 967 140 B1    5/2017
RU    2 600 915 C1    10/2016
(Continued)

OTHER PUBLICATIONS

International Search Report and Written Opinion dated Jan. 30, 2019 in PCT/EP2018/077032 filed Oct. 4, 2018.
(Continued)

*Primary Examiner* — Cynthia Szewczyk
(74) *Attorney, Agent, or Firm* — Oblon, McClelland, Maier & Neustadt, L.L.P.

(57) ABSTRACT

An aerosol-generating device is provided, including an electrical power source; an electrical heater; and a power control circuit connected between the power source and the heater, the circuit including a power measuring unit configured to determine a power supplied to the heater from the power source and to output a power measurement voltage proportional to power supplied to the heater, a voltage comparator connected to the power measuring unit and configured to output a voltage difference signal based on a difference between the power measurement voltage and a reference voltage, and a power regulator connected between the power source and the heater and responsive to the voltage difference signal, the power regulator being configured to adjust a current or a voltage supplied to the heater in
(Continued)

order to return the voltage difference signal to within a predetermined range or in order to minimize the voltage difference signal.

13 Claims, 3 Drawing Sheets

(51) Int. Cl.
*A24F 40/46* (2020.01)
*A24F 40/20* (2020.01)
*H02J 7/00* (2006.01)

(52) U.S. Cl.
CPC ......... *H02J 7/0063* (2013.01); *H02J 2207/20* (2020.01)

(56) References Cited

U.S. PATENT DOCUMENTS

| | | |
|---|---|---|
| 2015/0053214 A1 | 2/2015 | Alarcon et al. |
| 2015/0059779 A1 | 3/2015 | Alarcon et al. |
| 2015/0173124 A1 | 6/2015 | Qiu |
| 2016/0143359 A1 | 5/2016 | Xiang |
| 2017/0196263 A1 | 7/2017 | Sur |
| 2018/0140021 A1 | 5/2018 | Alarcon et al. |
| 2018/0146712 A1 | 5/2018 | Alarcon et al. |
| 2018/0192709 A1 | 7/2018 | Alarcon et al. |
| 2018/0242645 A1 | 8/2018 | Alarcon et al. |
| 2018/0271156 A1 | 9/2018 | Alarcon et al. |
| 2019/0021137 A1 | 1/2019 | Qiu |

FOREIGN PATENT DOCUMENTS

| | | |
|---|---|---|
| RU | 2 619 372 C2 | 5/2017 |
| WO | WO 2010/003480 A1 | 1/2010 |

OTHER PUBLICATIONS

Notice of Allowance dated Nov. 26, 2021 in Russian Application No. 2020115033 (with English Translation).

Search Report dated Nov. 24, 2021 in Russian Application No. 2020115033 (with English Translation).

\* cited by examiner

ELECTRICALLY OPERATED AEROSOL-GENERATING DEVICE WITH CONTINUOUS POWER REGULATION

The invention relates to electrically heated aerosol-generating systems and in particular to resistively heated aerosol-generating systems.

An electrically heated aerosol-generating system heats an aerosol-forming substrate to generate an aerosol. One example of an electrically heated aerosol-generating system is an electrically heated smoking system. In an electrically heated smoking system an aerosol-forming substrate, such as a plug of tobacco or a cigarette, is heated to a temperature at which volatile compounds are released to form an aerosol that a user can inhale.

In such as system, the temperature of the aerosol-forming substrate must be controlled to be below a temperature at which combustion of the tobacco product might occur. So in electrically heated aerosol-generating devices it is necessary to control the temperature of the heater. This is principally to ensure that an aerosol with desirable properties is generated. But for consumer satisfaction, it is also important for there to be a consistent amount of aerosol produced from one inhalation to the next.

The temperature of a heater may be controlled by limiting the magnitude of the voltage or current supplied to the heater. Alternatively, if current is supplied in pulses, the duty cycle or pulse width of the current may be altered to control heater temperature.

However, one issue with resistive heaters is that that the electrical resistance of the heater will tend to increase over time and typically varies with temperature. In a mass produced product, the electrical resistance may also vary from one heater to the next. This means that controlling the temperature achieved using simple voltage or current control will not provide consistent results over time or from one heater to another.

For this reason, typically, electrically heated aerosol-generating systems include a temperature sensor of some kind, in order to ensure temperature is reliably regulated. A microprocessor is also required to control the power supply based on the sensed temperature. However, these components are relatively complex and consume power. In hand-held, battery operated systems, it is desirable to minimise power consumption as far as possible.

It would be desirable to provide a system for regulating temperature that is simple and does not consume significant power itself. In particular, it would be desirable not to require a temperature sensor or the use of a microprocessor to perform calculations relating to the temperature.

In a first aspect of the invention, there is provided an aerosol-generating device comprising:
an electrical power source;
an electrical heater; and
a power control circuit connected between the electrical power source and the electrical heater, the power control circuit comprising:
a power measuring unit configured to determine a power supplied to the electrical heater from the electrical power source and to output a power measurement voltage proportional to the power supplied to the electrical heater;
a voltage comparator connected to the power measuring unit and configured to output a voltage difference signal based on a difference between the power measurement voltage and a reference voltage; and
a power regulator connected between the electrical power source and the electrical heater and responsive to the voltage difference signal, the power regulator configured to adjust the current or voltage supplied to the electrical heater in order to return the voltage difference signal to within a predetermined range or in order to minimise the voltage difference signal.

The device may operate by heating an aerosol-forming substrate to vaporise volatile compounds in the aerosol-forming substrate. The vaporised compounds then cool in an airflow to form an aerosol. The aerosol-generating device is preferably configured to generate an aerosol for user inhalation. As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article. As used herein, an 'aerosol-generating device' relates to a device that interacts with an aerosol-forming substrate to generate an aerosol.

The heat generated by an electrical heater as a result of Joule heating is proportional to the power applied to the heater multiplied by the time for which that power is applied. For a given thermal mass, the change in temperature of the mass is proportional to the heat applied to it. So the change in temperature of an aerosol-forming substrate proximate to the electrical heater will be proportional to the power applied to the heater multiplied by the time for which that power is supplied.

A system in accordance with the invention provides for simple regulation of power to control temperature. The power control circuit can be implemented using components that do not consume very much power. In particular no separate temperature sensor is required.

In addition, there is no need to calibrate each electrical heater because the power/temperature relationship for the system is independent of heater resistance. This is especially useful if the system is designed to use interchangeable or replaceable heaters. A system in accordance with the invention also obviates the problem of heater resistance drift.

A system in accordance with the invention also deals with the problem of decreasing battery voltage as a battery discharges and ages.

Advantageously, the power control circuit is an analogue circuit. In other words, the power measuring unit, voltage comparator and power regulator are all implemented using analogue circuit components. This has the advantage that the power control is carried out on a continuous basis rather than being performed periodically or intermittently. There is no need for processing steps to compute a required voltage or duty cycle or to store a look-up table of target values.

Using a regulated but continuous DC current is less stressful for the electronic components in the device than using pulses of current regulated using duty cycle modulation. In particular the use of a continuous but lower DC current reduces electromigration over time and so improves the reliability of the device.

A device in accordance with the invention does not require a battery to provide the maximum possible discharge current in the way that a duty cycle modulated device does. This improves battery life.

A device in accordance with the invention allows for production of small, low power, low cost devices, that are reliable.

In one embodiment, the power regulator is configured to adjust the current supplied to the electrical heater only if the voltage difference signal is outside of the predetermined range.

In another embodiment the power regulator is configured to adjust the current supplied to the electrical heater so that the applied power is adjusted towards the target applied power.

The aerosol-generating device may be configured to supply electrical power to the heater, for a predetermined time period following activation. The predetermined time period may correspond to a single user puff or inhalation or may correspond to a session of use of the device, covering more than one user puff. For example, the heater may be supplied with power for a period of two seconds after each activation. In that case, the heater may be activated only when a user puff is detected or when a user actuates a button immediately prior to a puff. Alternatively, in another example, the heater may be supplied with power for a period of six minutes after activation, corresponding to the typical time taken to smoke a conventional cigarette. During those six minutes, the user may take several puffs on the device. Whatever the period of activation of the heater, a constant power, or a power corresponding to a predetermined power profile, may be provided during activation. The use of analogue components for the power control circuit means that the power regulation occurs continuously during activation.

The power regulator may comprise a bipolar junction transistor having a base connected to an output of the voltage comparator. Alternatively, the power regulator may be a dropout regulator, such as a single resistance low current drop regulator. One example of such a regulator is the LT3083 from Linear Technology Corporation of 2085 E Technology Cir, Tempe, Ariz. 85284, USA.

The power measuring unit may comprise a multiplier unit configured to multiply a voltage applied to the electrical heater with a voltage indicative of the current applied to the electrical heater to provide the power measurement voltage.

The power measuring unit may comprise a current measurement unit configured to provide an output voltage indicative of the current applied to the electrical heater. The current measurement unit may comprise an operational amplifier. The operational amplifier may be connected across a sensing resistor of a known electrical resistance. Alternatively, the current measurement unit may be a Hall Effect sensor, for example the LTC1966 sensor from Linear Technology Corporation.

The aerosol-generating device may further comprise a microcontroller. The microcontroller may be configured to provide the reference voltage. The microcontroller may be configured to vary the reference voltage during operation of the device. This may be beneficial in order to produce consistent aerosol for the duration of operation of the device. For example, when heating a solid aerosol-forming substrate, such as a cigarette, the amount of volatile compounds in the aerosol-forming substrate becomes depleted during heating, and a greater power may need to be applied to a depleted substrate in order to generate a consistent aerosol. Changes in the reference voltage may be discontinuous or step-wise based on time following activation or another measured variable, such as user puffs on the device, or may be continuous. For example, the reference voltage is varied following each user puff on the device or may be varied following each n puffs, where n is an integer greater than one. In one example, the reference voltage is increased for each successive user puff following an initial activation of the device. The microcontroller may be configured to vary the reference voltage based on a detected number of user inhalations. Alternatively, or in addition, the microcontroller may be configured to vary the reference voltage based on time following activation of the device The reference voltage may be supplied by a different constant voltage source, such as a voltage regulator or a voltage divider.

In one embodiment, the voltage comparator comprises an operational amplifier. The inputs to the operational amplifier may be the reference voltage and the power measurement voltage. A current limiting resistor may be connected to the output of the operation amplifier.

The electrical heater may be removably coupled to the power control circuit to allow for replacement of the electrical heater. For example, the heater may be provided together with an aerosol-forming substrate in a consumable cartridge that is replaced when the aerosol-forming substrate has been exhausted. The power control circuit of the invention operates in a manner than means that it is unnecessary to calibrate each replacement electrical heater before use.

The electrical heater may be a resistive heater. The heater may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum, platinum, gold and silver. Examples of suitable metal alloys include stainless steel, nickel-, cobalt-, chromium-, aluminium-, titanium-, zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physico-chemical properties required.

The electrical heater may comprise an internal heating element or an external heating element, or both internal and external heating elements, where "internal" and "external" refer to the aerosol-forming substrate. An internal heating element may take any suitable form. For example, an internal heating element may take the form of a heating blade. The heating blade may be formed from a ceramic substrate with one or more resistive heating tracks, formed from platinum or another suitable material, deposited on one or both sides of the blade. Alternatively, the internal heater may take the form of a casing or substrate having different electro-conductive portions, or an electrically resistive metallic tube. Alternatively, the internal heating element may be one or more heating needles or rods that run through the centre of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of the substrate receiving cavity. Alternatively, an external heating element may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

In one embodiment the electrical heater comprises a mesh, array or fabric of electrically conductive filaments. The electrically conductive filaments may define interstices between the filaments and the interstices may have a width of between 10 µm and 100 µm.

The electrically conductive filaments may form a mesh of size between 160 and 600 Mesh US (+/−10%) (i.e. between 160 and 600 filaments per inch (+/−10%)). The width of the interstices is preferably between 75 µm and 25 µm. The percentage of open area of the mesh, which is the ratio of the area of the interstices to the total area of the mesh is preferably between 25 and 56%. The mesh may be formed using different types of weave or lattice structures. Alternatively, the electrically conductive filaments consist of an array of filaments arranged parallel to one another.

The electrically conductive filaments may have a diameter of between 8 µm and 100 µm, preferably between 8 µm and 50 µm, and more preferably between 8 µm and 39 µm. The filaments may have a round cross-section or may have a flattened cross-section.

The area of the mesh, array or fabric of electrically conductive filaments may be small, preferably less than or equal to 25 mm$^2$, allowing it to be incorporated in to a handheld system. The mesh, array or fabric of electrically conductive filaments may, for example, be rectangular and have dimensions of 5 mm by 2 mm. Preferably, the mesh, array or fabric of electrically conductive filaments covers an area of between 10% and 50% of the area of the heater assembly. More preferably, the mesh or array of electrically conductive filaments covers an area of between 15 and 25% of the area of the heater assembly.

The filaments may be formed by etching a sheet material, such as a foil. This may be particularly advantageous when the heater assembly comprises an array of parallel filaments. If the heating element comprises a mesh or fabric of filaments, the filaments may be individually formed and knitted together.

Preferred materials for the electrically conductive filaments are 304, 316, 304L, and 316L stainless steel.

In operation, the heater advantageously heats an aerosol-forming substrate by means of conduction. The heater may be at least partially in contact with the substrate, or the carrier on which the substrate is deposited. Alternatively, the heat from either an internal or external heating element may be conducted to the substrate by means of a heat conductive element.

During operation, an aerosol-forming substrate may be completely contained within the aerosol-generating device. In that case, a user may puff on a mouthpiece of the aerosol-generating device. Alternatively, during operation a smoking article containing an aerosol-forming substrate may be partially contained within the aerosol-generating device. In that case, the user may puff directly on the smoking article. The heating element may be positioned within a cavity in the device, wherein the cavity is configured to receive an aerosol-forming substrate such that in use the heating element is within the aerosol-forming substrate.

The smoking article may be substantially cylindrical in shape. The smoking article may be substantially elongate. The smoking article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The electrical power source may be any suitable power source, for example a DC voltage source. In one embodiment, the electrical power source is a Lithium-ion battery. Alternatively, the power source may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. The power source may require recharging and may have a capacity that allows for the storage of enough energy for one or more smoking experiences; for example, the power source may have sufficient capacity to allow for the continuous generation of aerosol for a period of around six minutes, corresponding to the typical time taken to smoke a conventional cigarette, or for a period that is a multiple of six minutes. In another example, the power source may have sufficient capacity to allow for a predetermined number of puffs or discrete activations of the heater.

Preferably, the aerosol-generating device comprises a housing. Preferably, the housing is elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the aerosol-generating device is portable. The aerosol-generating device may be an electrically heated smoking system and may have a size comparable to a conventional cigar or cigarette. The aerosol-generating device may be a smoking system. The smoking system may have a total length between approximately 30 mm and approximately 150 mm. The smoking system may have an external diameter between approximately 5 mm and approximately 30 mm.

The aerosol-generating device may be a one-piece device. Alternatively, the aerosol-generating device may comprise two or more pieces that are separable from each other but connected during operation. For example, the aerosol-generating device may comprise a main housing containing the power source and some or all of the power control circuit, and a cartridge portion containing the aerosol-forming substrate and a mouthpiece. The electrical heater may be in the main housing, in a cartridge portion or in a separate heater portion.

The electrical heater may be activated in response to a user actuating button on the device or may be activated in response to a sensed airflow rate through the device exceeding a threshold. The aerosol-generating device may comprise an airflow sensor for this purpose. Alternatively, or in addition, airflow may be determined by detecting changes in the temperature of the electrical heater. Significant airflow past the heater will have a cooling effect on the heater.

The device may be configured to generate an aerosol for user inhalation, and in use, user inhalation may draw air past the electrical heater. The device may comprise a memory and may be configured to record changes in current or voltage supplied to the electrical heater as an indication of a user inhalation. Airflow past the electrical heater will tend to cool the heater, which will change the electrical resistance of the electrical heater. A deviation in the electrical resistance of the heater will cause a deviation in the current or voltage required to maintain a particular power applied to the heater. The indication of a user inhalation may be used by a microcontroller to change the reference voltage in accordance with a predetermined reference voltage profile.

In a second aspect of the invention, there is provided a method for regulating a supply of power to an electrical heater in an electrically heater aerosol-generating system, the aerosol-generating system comprising an electrical power source, an electrical heater and a power control circuit connected between the electrical power source and the electrical heater, the method comprising:

determining a power supplied to the electrical heater from the electrical power source and generating a power measurement voltage proportional to the power supplied to the electrical heater;

generating a voltage difference signal based on a difference between the power measurement voltage and a reference voltage; and adjusting the current or voltage supplied to the electrical heater in order to maintain the voltage difference signal within a predetermined range or in order to minimise the voltage difference signal.

The method is preferably carried out using analogue circuitry. In this way the power to the electrical heater is regulated continuously while power is being supplied.

Examples in accordance with the invention will now be described in detail, with reference to the accompanying drawings, in which:

Figure 1:
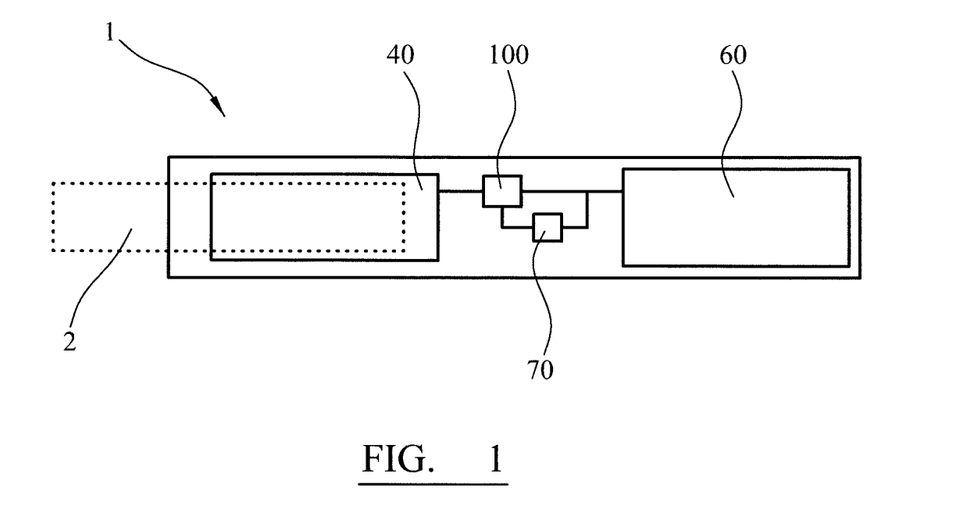
FIG. 1 is a schematic illustration of an electrically heated aerosol-generating system.

In FIG. 1, the components of an embodiment of an electrically heated aerosol generating device 1 are shown in a simplified manner. Particularly, the elements of the electrically heated aerosol generating device 1 are not drawn to scale in FIG. 1. Elements that are not relevant for the understanding of this embodiment have been omitted to simplify FIG. 1.

The electrically heated aerosol generating system comprises an aerosol-generating device 1 and an aerosol-forming substrate 2, for example a cigarette. The aerosol-forming substrate 2 is pushed inside the housing of the device 1 to come into thermal proximity with an electrical heater 40. The aerosol-forming substrate 2 will release a range of volatile compounds at different temperatures. By controlling the power supplied to the electrical heater, the release or formation of these volatile compounds can be controlled.

Within the device 1 there is an electrical energy supply 60, for example a rechargeable lithium ion battery. Power control circuitry 100 is connected to the heating element 40 and the electrical energy supply 60. A microcontroller 70 is connected to the power control circuitry 100 and to the electrical energy supply.

In this example, the heating element 40 is positioned on a rigid, blade-shaped substrate within the housing of the device. The blade-shaped substrate can penetrate the aerosol-forming substrate, which in this example is a cigarette. However, it should be clear that other forms of heating element can be used. In particular, the heating element may be positioned externally of the aerosol-forming substrate.

In use, power is supplied to the heater to heat the aerosol-forming substrate. A user draws on a mouthpiece end of the aerosol-forming substrate to draw air past the heater and the aerosol-forming substrate. Compounds in the aerosol-forming substrate that have been vaporised by the heater and entrained in the airflow, cool to form an aerosol before entering the user's mouth.

Figure 2:
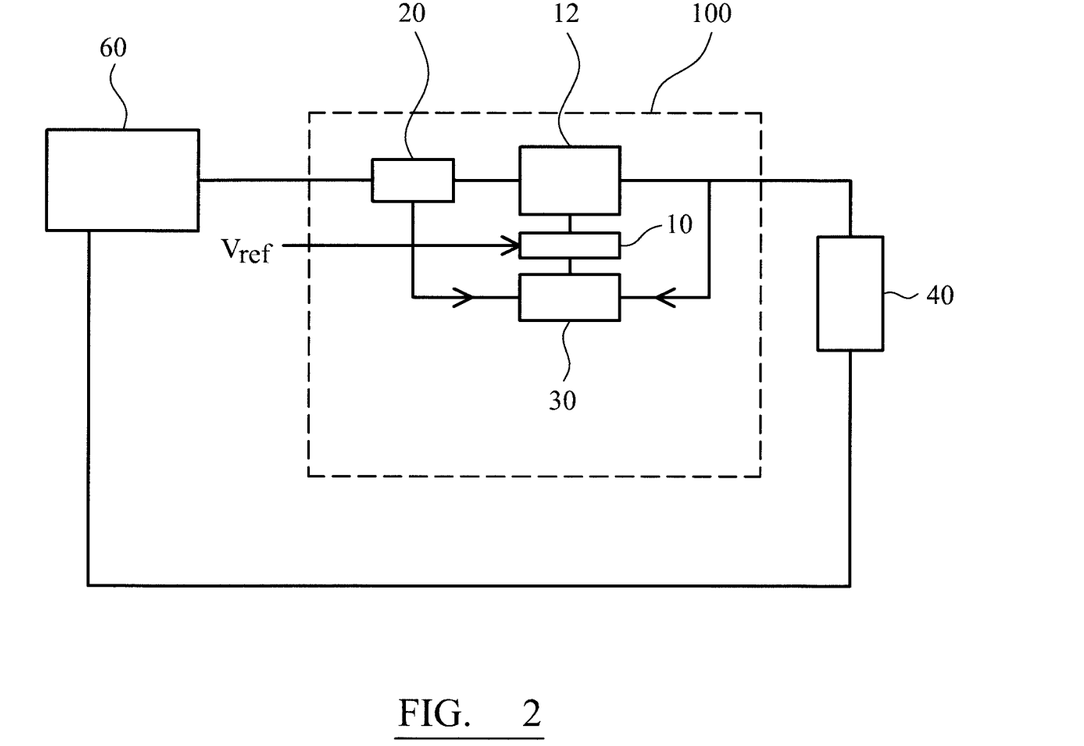
FIG. 2 is a schematic illustration of the components of a power control system for an electrically heated aerosol-generating system in accordance with the invention.

The basic elements of the power control circuitry 100 are shown schematically in FIG. 2 together with the battery 60 and the heater 40. The power control circuitry 100 comprises a current measurement unit 20, a power measurement unit 30, a voltage comparator 10 and a power regulator 12. The power regulator is configured to adjust the current or voltage applied to the heater 40 based on an output from the voltage comparator 10. The voltage comparator is configured to compare a reference voltage $V_{ref}$ with the output of the power measurement unit 30 and provide, as an output, a voltage representing a difference between $V_{ref}$ and the output of the power measurement unit 30. The power measurement unit is configured to measure the power supplied to the heater. The power measurement unit receives as inputs a voltage that is representative of the current that is applied to the heater 40 from the current measurement unit 20 and the voltage applied to the heater 40 by the power regulator. The power measurement unit provides as an output a voltage representative of the product of the input signals. The power regulator 12 is configured to act to minimise an output from the voltage comparator or to adjust the power applied to the heater 40 if the output from the voltage comparator is outside a predetermined range.

Figure 3:
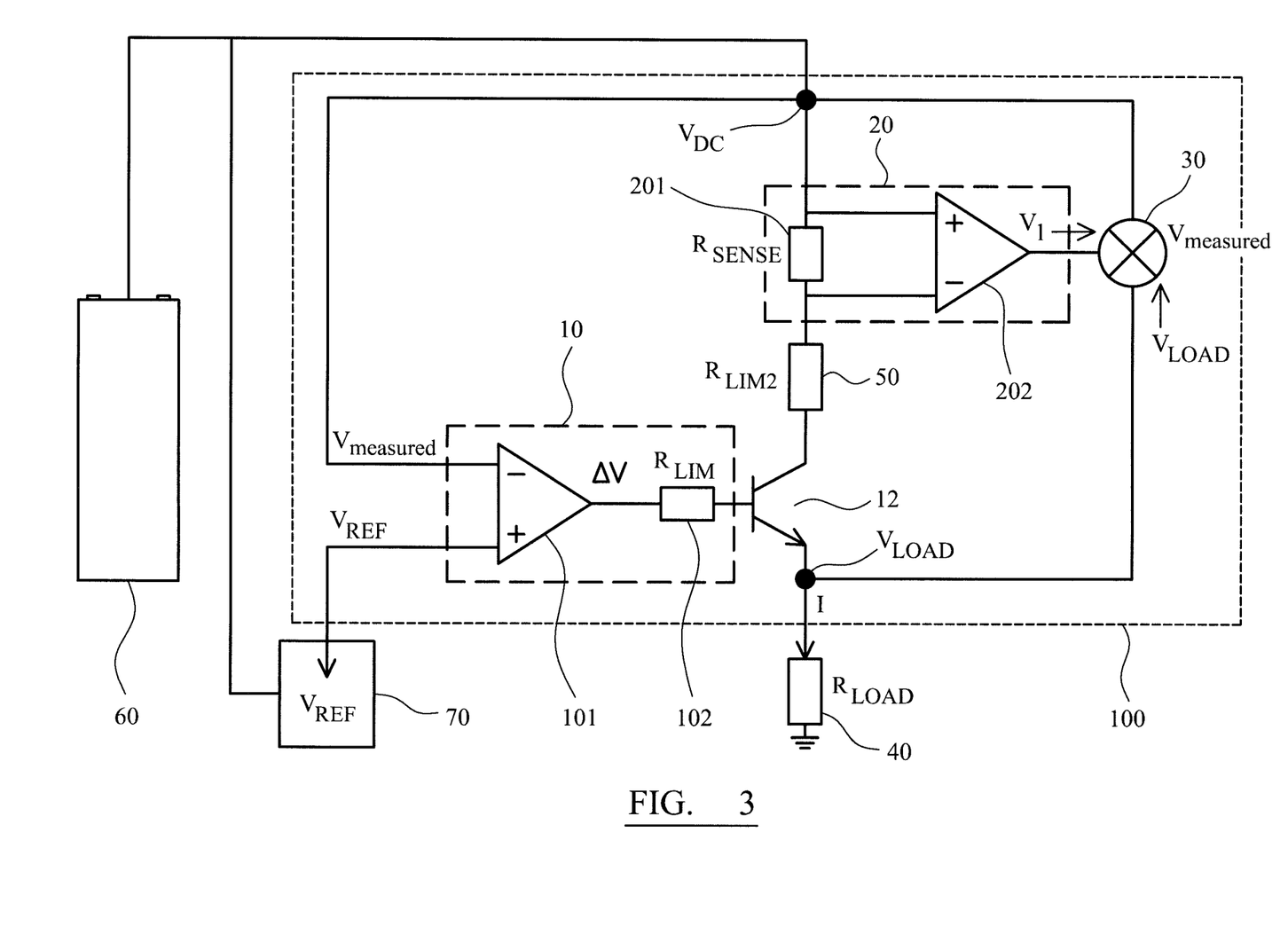
FIG. 3 is a circuit diagram of a power control system of the type shown in FIG. 2.

FIG. 3 shows one embodiment of the power control circuitry of FIG. 2. A lithium ion battery 60 is connected to an electrical heater 40 through the power control circuit 100. The battery 60 generates a voltage $V_{dc}$ that gives rise to a current through the heater 40. The heater heats up as a result of the Joule effect. The power control circuit 100 measures the power applied to the heater and adjusts the power applied based on the measurement. The power control circuit comprises the same functional components as shown in FIG. 2.

The power applied to the heater is determined by measuring the current using current measurement unit 20 and multiplying the measured current with the voltage applied to the heater. The current measurement unit comprises a resistor 201 of known electrical resistance connected in series with the electrical heater 40, and an operation amplifier 202. The current through the resistance 201 is equal to the current through the electrical heater 40. The current through the resistor 201 is equal to the voltage across the resistor 201 divided by its electrical resistance. The operational amplifier 202 is connected to the resistor 201 so that one input to the operational amplifier is connected to a high side of the resistor 201 and the other input to the operational amplifier is connected to a low side of the resistor 201. The output of the operational amplifier is therefore a voltage $V_I$ that is proportional to the current through the electrical heater 40. The output of the operational amplifier is connected to a multiplier 30, which is the power measurement unit. The other input to the multiplier 30 is the voltage $V_{load}$ across the heater 40.

The output of the multiplier 30 is a voltage $V_{measured}$, proportional to the power applied to the heater. This voltage is input to the voltage comparator 10. The voltage comparator 10 comprises an operational amplifier 101. The negative input to the operational amplifier 101 is $V_{measured}$. The positive input to the operational amplifier is a reference voltage $V_{ref}$. A microprocessor 70 provides a reference voltage $V_{ref}$ to the power control circuit. The microprocessor is powered by the battery 60.

The output of the operational amplifier 101 is the difference between $V_{measured}$ and $V_{ref}$, which is ΔV. A current limiting resistor 102 is provided between the output of the operational amplifier 101 and the power regulator 12 to limit the current flowing into the power regulator. Similarly a current limiting resistor 50 is connected in series with the heater 40 to limit the current through the heater 40.

The power regulator is a NPN transistor 12. The output of the voltage comparator is connected to the base of the transistor 12. If ΔV is within a particular range, then the current through the transistor 12 will be unchanged. However if ΔV is positive (when $V_{measured}$ is less than $V_{ref}$) and greater than a threshold value, then current through the transistor 12 is increased to increase power delivered to the heater 40. If ΔV is negative (when $V_{measured}$ is greater than $V_{ref}$) and greater than a threshold value, then current through the transistor 12 is decreased to decrease power delivered to the heater 40. In this way the value of the supplied power is regulated and in particular is held within a particular range dependent on the value of $V_{ref}$.

The power control circuit 100 acts as a control loop and uses analogue components so that power regulation is continuous and does not require sampling. If $V_{ref}$ is constant then the power supplied to the heater will remain with a predetermined range.

Figure 4:
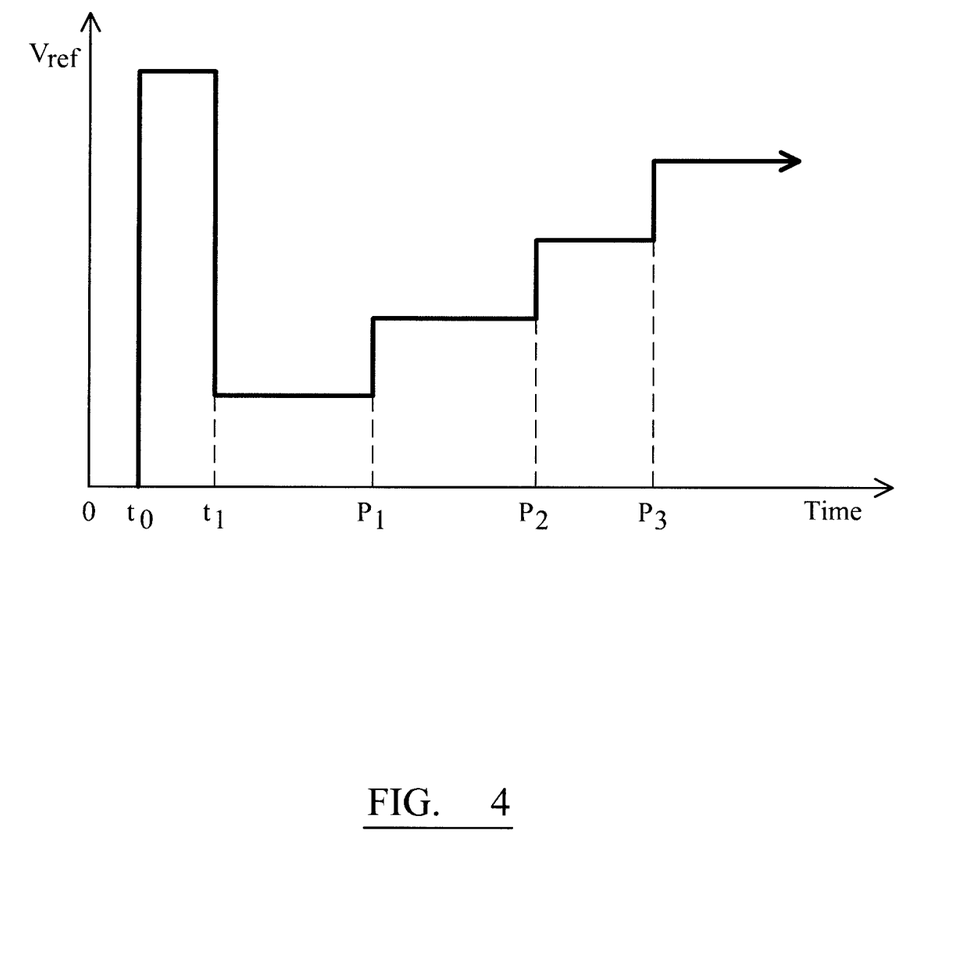
FIG. 4 is an example of a power profile for an electrically heated aerosol-generating system of the type shown in FIG. 1.

It is possible to adjust the power supplied to the heater 40 during operation of the device by adjusting the value of $V_{ref}$. FIG. 4 illustrates one example of the way in which $V_{ref}$ could vary during operation of a device of the type illustrated in FIG. 1. At time $t_0$ the device is activated by a user pressing an "on" button on the device. Initially $V_{ref}$ is set at a relatively high value in order to bring the heater 40 and aerosol-forming substrate 2 up to an operating temperature quickly. This is to allow a user to have a first puff as soon as possible. After a set time or based on a temperature measurement, at time ti, $V_{ref}$ is reduced to a lower value. This is to maintain the heater 40 at an operating temperature at which a desirable aerosol can be generated.

It may be desirable to increase the power applied to the heater as the aerosol-generating substrate becomes depleted in order to ensure that an adequate amount of aerosol is produced for each puff. The power may be increased following each user puff or following a set number of user puffs. For example, as shown in FIG. 4, at time $P_1$, after completion of three user puffs, $V_{ref}$ is increased. At times $P_2$ and $P_3$, corresponding to completion of fourth and sixth user puffs respectively, $V_{ref}$ is also increased. Alternatively, increases in $V_{ref}$ may be made simply at predetermined times after activation of the device.

User puffs may be detected using a dedicated airflow sensor in the device. Alternatively, user puffs may be detected by monitoring changes in the electrical resistance of the heater 40. Airflow past the heater as a result of user puffs will have a cooling effect on the heater, leading to a change in the electrical resistance of the heater. A change in the electrical resistance of the heater will result in a change to $V_{load}$ and correspondingly an increase in $V_1$. By monitoring $V_{load}$ or $V_1$ the start and end of user puffs can be detected. This information can be used to trigger changes in the reference voltage $V_{ref}$.

While the control circuit has been described with reference to the device illustrated in FIG. 1, it should be clear that it is applicable to other types of aerosol-generating device. In particular, it may be used in devices that have a heater positioned externally of an aerosol-generating substrate. For example, the heater 40 may be implemented as a flexible heater that surrounds a cavity in an aerosol-generating device, where the cavity is configured to receive an aerosol-forming substrate. In another example, the aerosol-generating device may be integral with the aerosol-forming substrate and designed to be disposed of when the aerosol-forming substrate is exhausted. In a further example, the heater 40 may be provided together with the aerosol-forming substrate in a disposable cartridge, with the power source and power control circuit provided in a reusable main unit.

Furthermore, while the control circuit has been described with reference to a device that supplies power to a heater continuously during operation of the device, it is applicable to devices configured to supply power to a heater only during user puffs or inhalations. For example, the microprocessor may be configured to provide a $V_{ref}$ of zero until a user puff is detected by a puff sensor in the device, and then to provide a positive value of $V_{ref}$ for a set time period, say two seconds, following detection of the user puff, before returning to a $V_{ref}$ of zero until the next user puff is detected. The value of $V_{ref}$ may change from puff to puff.

The invention claimed is:

1. An aerosol-generating device, comprising:
an electrical power source;
an electrical heater; and
a power control circuit connected between the electrical power source and the electrical heater, wherein the power control circuit is an analog circuit and comprises:
   a power measuring unit configured to determine a power supplied to the electrical heater from the electrical power source and to output a power measurement voltage proportional to power supplied to the electrical heater,
   a voltage comparator connected to the power measuring unit and configured to output a voltage difference signal based on a difference between the power measurement voltage and a reference voltage, and
   a power regulator connected between the electrical power source and the electrical heater and responsive to the voltage difference signal, the power regulator being configured to adjust a current or a voltage supplied to the electrical heater in order to return the voltage difference signal to within a predetermined range or in order to minimize the voltage difference signal,
wherein the power measuring unit, the voltage comparator, and the power regulator are all implemented using analog circuit components.

2. The aerosol-generating device according to claim 1, wherein the power regulator is further configured to adjust the current supplied to the electrical heater only if the voltage difference signal is outside of the predetermined range.

3. The aerosol-generating device according to claim 1, wherein the power regulator comprises a bipolar junction transistor having a base connected to an output of the voltage comparator.

4. The aerosol-generating device according to claim 1, wherein the power measuring unit comprises a multiplier unit configured to multiply a voltage applied to the electrical heater with a voltage indicative of the current applied to the electrical heater to provide the power measurement voltage.

5. The aerosol-generating device according to claim 1, wherein the power measuring unit comprises a current measurement unit configured to provide an output voltage indicative of the current applied to the electrical heater.

6. The aerosol-generating device according to claim 1, further comprising a microcontroller configured to provide the reference voltage.

7. The aerosol-generating device according to claim 6, wherein the microcontroller is further configured to vary the reference voltage during operation of the aerosol-generating device.

8. The aerosol-generating device according to claim 7, wherein the microcontroller is further configured to vary the reference voltage based on a detected number of user inhalations.

9. The aerosol-generating device according to claim 7, wherein the microcontroller is further configured to vary the reference voltage based on time following activation of the aerosol-generating device.

10. The aerosol-generating device according to claim 1, wherein the aerosol-generating device is a handheld device.

11. The aerosol-generating device according to claim 1, wherein the electrical heater is removably coupled to the power control circuit and is configured to allow for replacement of the electrical heater.

12. The aerosol-generating device according to claim 1,
   wherein the aerosol-generating device is configured to generate an aerosol for user inhalation, and, in use, user inhalation draws air past the electrical heater, and
   wherein the aerosol-generating device comprises a memory and is configured to record changes in current or voltage supplied to the electrical heater as an indication of user inhalation.

13. A method for regulating a supply of power to an electrical heater in an electrically heated aerosol-generating system, the aerosol-generating system comprising an electrical power source, an electrical heater, and a power control circuit connected between the electrical power source and the electrical heater, wherein the power control circuit is an analog circuit, and wherein the power measuring unit, the voltage comparator, and the power regulator are all implemented using analog circuit components, the method comprising:
   determining a power supplied to the electrical heater from the electrical power source and generating a power measurement voltage proportional to power supplied to the electrical heater;
   generating a voltage difference signal based on a difference between the power measurement voltage and a reference voltage; and
   adjusting a current or a voltage supplied to the electrical heater in order to maintain the voltage difference signal within a predetermined range or in order to minimize the voltage difference signal.

* * * * *